United States Patent

Sakurada et al.

[15] 3,652,435
[45] Mar. 28, 1972

[54] PROCESS FOR GRAFT POLYMERIZATION OF POLYMERIZABLE MONOMERS TO POLYETHYLENE TEREPHTHALATE IN PRESENCE OF A CARBON OR SILICON HALIDE

[72] Inventors: Ichiro Sakurada, Kyoto-shi, Kyoto-fu; Toshio Okada, Moriguchi-shi, Osaka-fu, both of Japan

[73] Assignee: Japan Atomic Energy Research Institute, Tokyo, Japan

[22] Filed: Mar. 17, 1969

[21] Appl. No.: 807,938

[30] Foreign Application Priority Data

Mar. 19, 1968 Japan....................................43/17842

[52] U.S. Cl....................204/159.15, 8/DIG. 12, 8/DIG. 18, 260/33.8 R, 260/873
[51] Int. Cl....................C08g 39/10, C08g 51/30, B01j 1/10
[58] Field of Search.................260/873, 33.8 R; 204/159.15; 8/DIG. 18; 81/115.5

[56] References Cited

UNITED STATES PATENTS

| | | | |
|---|---|---|---|
| 3,092,512 | 6/1963 | Magat et al. | 8/DIG. 18 |
| 3,131,138 | 4/1964 | Durup et al. | 8/DIG. 18 |
| 3,281,263 | 10/1966 | Priesing et al. | 204/159.15 |
| 3,405,087 | 10/1968 | Fryd | 260/873 |
| 3,424,820 | 1/1969 | Magat et al. | 260/873 |
| 3,482,926 | 12/1969 | Cappuccio | 81/115.5 |

OTHER PUBLICATIONS

Chem. Abstracts, Vol. 70, 1969, 116147C, " Radiation–Induced Graft–Polyesters," Okada et al.

Primary Examiner—William H. Short
Assistant Examiner—Edward Woodberry
Attorney—Toren & McGeady

[57] ABSTRACT

Graft polymerization of a polymerizable monomer to polyethylene terephthalate or to a polyester polymer consisting mainly of polyethylene terephthalate is carried out in the presence of a halide of the general formula $$M_n X_{2n+2}$$

wherein M is carbon or silicon, X is halogen and $n$ is a positive integer.

14 Claims, No Drawings

PROCESS FOR GRAFT POLYMERIZATION OF POLYMERIZABLE MONOMERS TO POLYETHYLENE TEREPHTHALATE IN PRESENCE OF A CARBON OR SILICON HALIDE

SUMMARY OF THE INVENTION

This invention generally relates to graft polymerization and is particularly directed to an improved process for graft polymerizing a polymerizable organic monomer to a polyester polymer.

Polyester polymers, as for example polyethylene terephthalate with which the invention is primarily concerned, are high molecular weight compounds that are widely used in the manufacture of synthetic fibers, films and the like fabricated articles. Such polymers exhibit, however, certain disadvantageous properties which negatively affect their usefulness. They are thus hygroscopic and take dyes with difficulty only. Further, they are readily charged electrostatically, thereby attracting dust particles which have a tendency to adhere and deposit on the polymer surfaces and are difficult to be removed therefrom. The adhesive properties of these polymers to rubber are also extremely poor.

With a view to overcoming these disadvantages, it has previously been attempted to graft a suitable polymerizable monomer to the polyester. Various graft polymerization procedures have been proposed for this purpose. For example, it has been suggested that the grafting of the polymerizable monomer to the polyester be effected while irradiating the polyester with high energy ionizing rays in the presence of a swelling agent for the polyester. A number of swelling agents have been proposed for this purpose, for example, organic acids such as formic acid or acetic acid, inorganic acids, such as sulfuric acid, alcohols, such as methanol or ethanol and the like. According to a different method, graft polymerization is effected in the presence of a polymerization initiator such as, for example, benzoyl peroxide or azobisisobutyronitrile. These prior art methods, however, are unsatisfactory to the extent that the yield, to wit, the grafting percentage is low. In addition, these methods are relatively cumbersome to carry out.

Accordingly, it is a primary object of the present invention to provide a process for graft polymerizing a polymerizable monomer to a polyester which overcomes the disadvantages of the prior art procedures and which results in a grafted product of high grafting percentage.

Another object of the present invention is to provide a process of the indicated kind in which the formation of polymers other than the desired graft polymer is effectively suppressed.

Still another object of the present invention is to provide a process for graft polymerizing a polymerizable monomer to fibrous polyester without degrading or negatively affecting the properties of the fibers.

It is also an object of the present invention to provide a process of the indicated kind wherein the final product has superior opening and separating properties, can be readily dyed and has superior thermal, mechanical and chemical characteristics.

Generally, it is an object of the present invention to improve on the art of graft polymerization as presently practiced.

Briefly, and in accordance with this invention, the above objects are superiorly obtained by carrying out the graft polymerization in the presence of a halide represented by the general formula $$M_nX_{2n+2}$$

wherein M represents carbon or silicon, X is halogen and $n$ is a positive integer.

The polymerizable monomer should be of hydrophilic nature and is advantageously applied to the system in the form of an aqueous solution or dispersion. A wide variety of polymerizable monomers may be used for the inventive purposes such as, for example, polymerizable organic bases, organic acids and organic acid salts.

In essence, therefore, the invention provides for a process wherein a hydrophilic monomer, such as a polymerizable organic base, organic acid or organic acid salt, is grafted to a polyester in the presence of the indicated halide.

The inventive procedure is preferably carried out by first impregnating the polyester with the halide, which is a fully halogenated compound, such as, for example, carbon tetrachloride, hexachloroethane, carbon tetrabromide or silicon tetrachloride. Due to the impregnation of the polyester with the halide, a certain percentage of halide is incorporated within the polyester structure and, after admixture with the monomer, the graft polymerization is then conducted. The grafting reaction proceeds smoothly and no grafting initiator is generally required.

It is an important feature of the present invention that the beneficial effects are dependent on the use of a fully halogenated compound. Experiments have thus indicated that halogenated hydrocarbons which are not fully halogenated, such as, for example, chloroform, ethylene dichloride and trichloroethylene, do not yield satisfactory results. Further, the use of prior art swelling agents for polyesters, such as benzene and dimethylformamide, does not result in comparable grafting effects. As a matter of fact, the grafting percentage obtained with the use of swelling agents or incompletely halogenated hydrocarbons is essentially zero. While applicants do not wish to be limited by any theories advanced by them, it is believed that the fully or completely halogenated compound in whose presence the inventive grafting reaction is carried out, acts not only as a swelling agent for the polyester but also forms a complex with the polyester, which complex in turn reacts with the monomer to form a radical or radicals to initiate the graft polymerization.

The term "polyester" as used in this application is deemed to refer to polyethylene terephthalate and to polyesters whose principal component is polyethylene terephthalate. Thus, polyesters comprising an additional component and polyester mixtures mainly consisting of polyethylene terephthalate are encompassed within the definition of polyester as used in this application. The polyester may be supplied to the grafting reaction in the form of fibers, yarns, fabrics, films, flakes, powder and the like.

As previously stated, the halide in whose presence the inventive reaction is carried out is indicated by the general formula $M_nX_{2n+2}$, wherein M is carbon or silicon, X is halogen, and $n$ is a positive integer. These halides are thus either completely halogenated hydrocarbons, such as carbon tetrachloride, carbon tetrabromide and hexachloroethane, or are completely halogenated silicones, such as silicon tetrachloride.

It has been ascertained that a certain minimum amount of halide has to be incorporated within the polyester structure in order to initiate and successfully carry out the grafting reaction. Is has thus been found that at least 0.3 percent by weight of halide, calculated on the amount of polyester, has to be present to obtain satisfactory results. For example, when carbon tetrachloride is employed as the halide, 0.3–25 percent by weight of carbon tetrachloride, calculated on the weight of the polyester, gives the best result.

The halide may be supplied to the reaction in different ways. According to one embodiment, and if the halide is a liquid, such as for example carbon tetrachloride, the polyester is advantageously immersed in the liquid halide, whereby the halide becomes incorporated into the polyester. However, if the halide is a solid, such as, for example, carbon tetrabromide or hexachloroethane, the solid halide may first be dissolved in a solvent such as benzene, and the polyester is then immersed in the solution. The immersion of the polyester in the halide may be advantageously effected at temperatures above room temperature.

Assuming that the halide is carbon tetrachloride and the polyester is in the form of non-stretched non-crystalline polyethylene terephthalate fibers, the principal concepts of the invention may be briefly summarized as follows:

The polyester fibers are impregnated so as to incorporate therein at least 0.3 percent by weight of carbon tetrachloride, to wit, the minimum amount necessary for successfully carrying out the inventive process. The impregnation may be performed by immersing the polyester fibers in the carbon tetrachloride at room temperature or at elevated temperatures. After the immersion, the fibers are withdrawn from the immersion bath. If the polyester fibers are immersed in the carbon tetrachloride liquid for, say, 30 minutes, the amount of liquid incorporated in the polyester is 0.8 percent if the immersion took place at 30° C. The corresponding amount is 5.4 percent if the impregnation took place at 35° C. and 18 percent at immersion temperatures in excess of 40° C. For incorporating about 4 percent of carbon tetrachloride in the polyester, the immersion of the polyester in the liquid should last for about 5 minutes at 40° C., 2.5 minutes at 50° C. and 1 minute at 55° C. It will thus be appreciated that the temperature of the immersion bath is a factor in respect to the amount of halide to be incorporated, the amount of incorporation also being dependent on the immersion time.

However, in case crystalline polyester fibers are to be treated which have been obtained by stretching and by subjecting non-crystalline fibers to heat treatment, the polyester fibers may then be immersed in a mixture of carbon tetrachloride and chloroform or dimethylformamide, the latter being a good swelling agent for polyesters. The mixing ratio of the carbon tetrachloride on the one hand and the chloroform or dimethylformamide on the other hand should preferably be about 1:1. By using such a mixture, the polyester can be treated essentially in the same manner as in the treatment of non-stretched polyester. For example, by treating the polyester with the indicated mixed liquid system at a temperature in excess of 60° C. but lower than the boiling point of the mixture, the amount of liquid incorporated in the polyester can be increased to 20–32 percent. Further, with a view to obtaining a similar effect, non-stretched polyester fibers may be immersed first in carbon tetrachloride as described above, whereupon the thus impregnated fibers are stretched in a conventional manner.

The polyester in whose structure the completely halogenated compound has been incorporated is then caused to react with an aqueous solution or dispersion of the polymerizable monomer which, as previously stated, may be a polymerizable organic base, organic acid or an organic acid salt.

A large variety of such polymerizable monomers may be used. The following examples are illustrative of suitable polymerizable monomers.

Organic base such as 4-vinylpyridine and 2-vinyl-pyridine; organic acid such as acrylic acid, methacrylic acid, maleic anhydride, itaconic acid, vinylsulfonic acid, and styrene sulfonic acid; organic acid salt such as a sodium salt of the aforesaid organic acids.

Monomers exhibiting low water solubility are most profitably used in the form of aqueous dispersions. For this purpose, it is advantageous to prepare an emulsion of the respective monomer. The emulsions are advantageously prepared with the aid of a nonionic surface active agent such as polyoxyethylene sorbitan monolaurate and sorbitan laurate or a cationic surface active agent such as stearyltrimethyl ammonium chloride and cetylpyridinium chloride in an amount of 0.1–1.0 percent by weight. However, is is perfectly feasible to use the monomers in the form of aqueous solutions. The concentration of the monomer and other additives, such as non-polymerizable acid, as mentioned below, is advantageously in the range of 1–20 percent by weight.

The grafting reaction is advantageously conducted at a temperature of from room temperature to about 100° C. However, the reaction temperature is not really critical and and the inventive process therefore is not limited to a particular temperature range.

The reaction may be effectively conducted in the presence of air. However, it is preferred to perform the grafting reaction either in vacuo or in an inert gas atmosphere such as a nitrogen atmosphere, whereby the reaction period for obtaining the desired grafting percentage may be materially reduced. Further, the grafting reaction may be promoted by irradiation. Ionizing high energy rays are thus effective for facilitating the reaction. On the other hand, the addition of known prior art polymerization initiators is not particularly effective for the purposes of increasing the grafting percentage.

The invention encompasses not only the use of a single polymerizable monomer to be grafted to the polyester, but mixtures of several polymerizable monomers may also be used. When a combination of monomers is used as, for example, a combination of a polymerizable base and a polymerizable organic acid or an organic acid salt, the grafting reaction can be further promoted and at the same time undesired side polymerization reactions for the formation of non-graft polymers can be effectively suppressed.

There are no particular limitations in respect to the combination of polymerizable monomers and any suitable combination may be selected in accordance with the kind of monomers to be employed. However, in case where a polymerizable organic base such as 4-vinylpyridine is graft-polymerized to polyester, it is preferable to add 3–20 parts of polymerizable organic acid to 80–97 parts of the polymerizable organic base and also in case where a polymerizable organic acid such as acrylic acid is graft-polymerized to polyester, it is preferable to incorporate 5–30 parts of polymerizable organic base to 70–95 parts of the organic acid. By selecting the above combination of monomers, the formation of other polymers than graft polymer can be very remarkably suppressed.

In addition, the effects of promoting the graft polymerization and suppressing the formation of non-graft polymers can also be obtained by adding a small proportion of such non-polymerizable organic acids as oxalic acid, formic acid, acetic acid, propionic acid and benzoic acid or an inorganic acid such as sulfuric acid, hydrochloric acid, nitric acid, phosphoric acid and boric acid, to the polymerizable organic base or by adding pyridine to the polymerizable organic acid. Furthermore, when the grafting reaction is conducted while adding a small proportion of an acid to the polymerizable organic base, the pH of the polymerization system is adjusted to about 7, whereby the grafting can be achieved without causing the degradation of the polyesters and fibers prepared from the polymer. In other words, in the process of this invention, when the polymerizable organic base or the polymerizable organic acid is used alone as the monomer to be grafted to polyester, the pH of the polymerization system is strikingly increased in the former case and considerably decreased in the latter case. Accordingly, in both cases, the polyester fibers thus treated might thus be degraded during the graft polymerization. This is avoided by using a combination of polymerizable organic base and polymerizable organic acid, a combination of polymerizable organic base and a non-polymerizable organic acid, or a combination of polymerizable organic acid and non-polymerizable organic base. The pH of the polymerization system can thus be controlled besides the suppression of the occurrence of the non-grafting reaction, as mentioned above, and hence the degradation of fibers is effectively prevented.

The invention also encompasses that the monomer to be graft-polymerized to polyester can be graft-polymerized together with a vinyl monomer such as acrylonitrile, styrene, methyl methacrylate, ethyl methacrylate, propyl methacrylate, butyl methacrylate, methyl acrylate, ethyl acrylate, propyl acrylate, butyl acrylate and vinyl acetate. This manner of operation is very effective from a practical point of view. The kind of monomers capable of being graft-polymerized to polyester can thus be extended to include inexpensive and easily available vinyl monomers and hence the process is very economical. For example, since 4-vinylpyridine or acrylic acid can be graft-copolymerized to polyester together with acrylonitrile, polyester fibers having a high fastness and good dyeing property and heat resistance can be readily obtained.

Furthermore, since 4-vinylpyridine and styrene can be graft-copolymerized to polyester, polyesters having an excellent moldability and fabricability can be obtained.

The process of this invention is very effective for graft-polymerizing polymerizable organic base, polymerizable organic acid or organic acid salt to polyester. For example, usual polyethylene terephthalate fibers are not dyed by Brilliant Scarlet 3R or Crystal Violet or are only faintly dyed by Kayalon Fast Brown, which is a dispersed dye. By contrast, when 4-vinylpyridine is graft-copolymerized to polyethylene terephthalate fibers together with a polymerizable organic acid such as acrylic acid, the grafted polyethylene terephthalate fibers are dyed deeply by these dyes as in wool. Furthermore, the polyester fibers processed by the process of this invention exhibit strikingly improved hygroscopic and antistatic properties.

The process of this invention will now be explained by the following examples, although the invention shall not be limited to them, "percent" in all instances being percent by weight.

The invention will now be described by several examples it being understood, however, that these examples are given by way of illustrations and not by way of limitations and that many changes may be effected without effecting the scope and spirit of the invention as recited in the appended claims.

EXAMPLE 1

After washing in cold water for 24 hours and drying at room temperature under reduced pressure, about 100 mg. of unstretched polyester fibers (yarn which consist of 18 monofilaments each having 10 deniers) were immersed in carbon tetrachloride for 1 hour at 50° C. and then air-dried for 1 hour at room temperature. By measuring the weight of the fibers, it was ascertained that the fibers contained 16.1 percent of carbon tetrachloride.

The fibers were inserted into a test tube having an outer-diameter of 1 cm. 10 ml. of an aqueous emulsion (pH 8.8) of 10 percent 4-vinylpyridine and 0.5 percent of an emulsifier known as Nissan nonion LT–221 (trade name of Nissan Chemical Industry Co. for polyoxyethylene sorbitan monolaurate) was poured in the test tube. After purging the air in the test tube with nitrogen, the test tube was sealed. After heating the system for 2 hours at 50° C., the fibers were withdrawn from the test tube, washed with water for 16 hours at 50° C., and washed with ethanol for 16 hours at 50° C. to remove non-grafted polymers. The fibers were weighed after drying them at 50° C. in a vacuum oven to ascertain the percentage of weight increase (grafting percentage) which was 21.0 percent.

For comparison purposes, the same graft polymerization procedure was carried out under the same conditions except that no pretreatment with carbon tetrachloride was effected. The percentage of weight increase was then only 1.0 percent.

EXAMPLE 2

The same procedure as in Example 1 was carried out but using an aqueous emulsion (pH 7.2) prepared by adding 0.1 ml. of acrylic acid to 10 ml. of the aforesaid emulsion of 10 percent 4-vinylpyridine and 0.5 percent emulsifier. The grafting percentage in this experiment was 31.1 percent. The grafting percentage was thus higher than that in Example 1. Further, the formation of undesirable polymer other than the graft polymer was effectively suppressed and the opening property of the grafted fibers was improved. In addition, when the grafted fibers thus obtained were stretched to five times their original length in hot water of 80° C., the strength of the fibers was 3.45 g./denier.

For comparison purposes and without pretreating the polyester fibers in carbon tetrachloride, the polyester fibers were immersed in an aqueous emulsion of 10 percent 4-vinylpyridine and 0.5 percent of the emulsifier and then irradiated by gamma rays of $1.1 = 10^4$ roentgens/hr. for 4 hours at 50° C. In this case, the grafting percentage was 30.2 percent. When the grafted fibers were stretched to five times their original length under the same conditions as described above, the strength thereof was 3.02 g./denier.

EXAMPLE 3

By the same procedure as in Example 1 and 2, 4-vinylpyridine, respectively a mixture of 4-vinylpyridine and acrylic acid was graft-polymerized to polyester. In this test, however, the fibers were irradiated by gamma rays of $1.1 \times 10^4$ roentgens/hr. for 2 hours at 50° C. instead of simply heating them for 2 hours at 50° C. The results are shown in the following Table 1.

TABLE 1

| Amount of acrylic acid (ml.)* | pH | Grafting percentage CCl$_4$ content 15–16% | No CCl$_4$ |
|---|---|---|---|
| 0 | 8.8 | 41.5 | 8.1 |
| 0.05 | 7.5 | 53.6 | 7.7 |
| 0.10 | 7.2 | 67.9 | 4.0 |
| 0.15 | 6.8 | 49.5 | 2.9 |
| 0.20 | 6.5 | 25.5 | 3.7 |

*The amount of acrylic acid added to 10 ml. of an emulsion of 10% 4-vinylpyridine.

The above results confirm that the incorporation of carbon tetrachloride is a decisive factor for obtaining an increase of the grafting percentage.

In addition, it was found that by adding acrylic acid, the formation of non-graft polymers was effectively suppressed and the opening property of the grafted fibers was improved.

EXAMPLE 4

After washing with cold water for 24 hours and drying at room temperature under reduced pressure, about 100 mg. of unstretched polyester fibers (yarn of 70 filaments each having 5.5. deniers) were immersed in carbon tetrachloride for 1 hour at 50° and dried for 30 minutes at room temperature under reduced pressure. By weighing the fibers, it was confirmed that the fibers contained about 18 percent of carbon tetrachloride.

The fibers were thereafter immersed in 5 ml. of an aqueous emulsion (pH 7.0) of 10 parts of 4-vinylpyridine, 1 part of methacrylic acid, 90 parts of water and 0.5 part of the aforesaid emulsifier in a test tube. After passing nitrogen through the test tube for 2 minutes, the tube was sealed. After heating for 2 hours at 50° C., the grafting percentage was 31.3 percent.

When the fibers were irradiated by gamma rays of the same dosage as in Example 3 at 50° C., the grafting percentage was 32.2 percent. On the other hand, for comparison, when the same procedure as above was applied to polyester fibers which had not been immersed in carbon tetrachloride, the grafting percentage was only 0.6 percentage and even if the irradiation of gamma rays was performed, the grafting percentage was only 9.0 percent.

EXAMPLE 5

Polyester fibers as in Example 1 were immersed in carbon tetrachloride for 20 hours at 40° C. After withdrawal of the fibers and drying for 5 minutes in air, the fibers contained 18.2 percent of carbon tetrachloride. The fibers (about 200 mg.) were then placed in a test tube having a diameter of 1 cm. and 6 ml. of a 5 percent aqueous solution (pH 6.8) of sodium styrenesulfonate containing 2.5 percent of a surface active agent were added to the test tube. After purging the air in the test tube with nitrogen and sealing the tube, the system was reacted for 3 hours at 60° C. After termination of the reaction, the homopolymer formed was extracted with water and the grafting percentage of sodium styrenesulfonate was ascertained to be 10.5 percent.

The same procedure as above was carried out using styrenesulfonic acid (pH 6.2) instead of sodium styrenesulfonate. After completion of the reaction, the homopolymer thus formed was extracted with diluted aqueous ammonia and water. The grafting percentage of styrenesulfonic acid was 9.5 percent.

EXAMPLE 6

A sample containing 17.4 percent of carbon tetrachloride was prepared by treating 100 mg. of polyester fibers of Example 1 according to the same procedure as described in Example 1. The yarn was placed in a test tube and 5 ml. of a mixture (pH 3.4) of 10 parts of acrylic acid, 2 parts of 2-vinylpyridine, 0.5 parts of the emulsifier as in Example 1, and 90 parts of water was added to the test tube. After purging the air in the test tube with nitrogen for 2 minutes and sealing the tube, the system was reacted for 2 hours at 50° C. The fibers were thereafter withdrawn from the test tube, washed with water for 16 hours at 50° C. and further washed with ethanol for 16 hours at 50° C. to remove non-grafted polymers. The grafting percentage of the grafted fibers was 3.5 percent. When irradiation of $1.1 \times 10^4$ roentgens/hr. of gamma rays was applied to the fibers during the reaction, the grafting percentage was 6.3 percent.

EXAMPLE 7

By treating 100 mg. of polyester fibers as in Example 4 according to the procedure of Example 1, 18.2 percent carbon tetrachloride was added to the fibers. The fibers were placed in a test tube having an outer diameter of 1 cm. 5 ml. of a mixture (pH 4.2) of 6 parts of acrylic acid, 4 parts of pyridine, 0.5 parts of the emulsifier of Example 1, and 90 parts of water was added to the test tube. After purging the air in the test tube with nitrogen and sealing it, the system was heated for 2 hours at 50° C. and the yarn was processed as in Example 6. The grafting percentage of the grafted fibers was 2.0 percent.

When irradiation with gamma rays was carried out as in Example 6, the grafting percentage was 8.9 percent On the other hand, when the irradiation with gamma rays was conducted without previously impregnating the fibers with carbon tetrachloride, the grafting percentage of the grafted fibers was only 0.3 percent.

EXAMPLE 8

The polyester fibers of Example 1 were impregnated with about 18 percent of carbon tetrachloride by the same procedure as in the above example and the fibers and a 5 percent aqueous solution of 4-vinylpyridine and sodium styrenesulfonate in an amount of 30 times the weight of the fibers were heated at 60° C. for 3 hours in a nitrogen atmosphere. Thereafter, the fibers were washed with ethanol and the grafting percentage was measured, the results of which are shown in the following Table 2 together with the proportions of the monomer components used above.

TABLE 2

| Monomer mixing ratio in wt. | | Grafting percentage |
|---|---|---|
| 4-vinylpyridine | Sodium styrenesulfonate | |
| 10 | 0 | 91.3 |
| 8 | 2 | 85.9 |
| 6 | 4 | 56.6 |
| 4 | 6 | 32.3 |
| 2 | 8 | 11.1 |
| 0 | 10 | 10.2 |

EXAMPLE 9

The polyester fibers as in Example 1 were impregnated with about 18 percent of carbon tetrachloride by the same procedure as in the above-mentioned example. The fibers were subjected to graft polymerization for 6 hours at 60° C. with the addition of a 10 percent aqueous solution of 4 vinylpyridine and a non-polymerizable organic acid such as acetic acid or oxalic acid or an inorganic acid such as sulfuric acid or hydrochloric acid. After washing the fibers with ethanol, the grafting percentage of the grafted fibers was measured. The results are shown in the following Table 3.

TABLE 3

| Mixing ration in weight | | pH of liquid | Grafting percentage |
|---|---|---|---|
| 4-Vinylpyridine | Non-polymerizable acid | | |
| 9 | acetic acid 1 | 6.6 | 116.0 |
| 8 | acetic acid 2 | 6.2 | 9.0 |
| 9 | oxalic acid 1 | 7.2 | 73.6 |
| 7 | oxalic acid 3 | 6.0 | 7.0 |
| 9 | sulfuric acid 1 | 6.6 | 33.0 |
| 7 | sulfuric acid 3 | 4.5 | 7.3 |
| 9 | hydrochloric acid 1 | 6.0 | 48.8 |
| 7 | hydrochloric acid 3 | 2.0 | 7.4 |

EXAMPLE 10

The same grafting procedure as in Example 8 was carried out, using a mixture of 4-vinylpyridine and acrylonitrile instead of a mixture of 4-vinylpyridine and sodium styrene-sulfonate. After non-graft polymers were removed from the fibers by washing with ethanol, a graft polymer having a high grafting percentage as shown in Table 4 was obtained. On the other hand, when only acrylonitrile was used in the same procedure, the grafting percentage was very low.

TABLE 4

| Mixing ration in weight | | Grafting percentage (%) |
|---|---|---|
| 4-Vinylpyridine | Acrylonitrile | |
| 10 | 0 | 47.2 |
| 8 | 2 | 84.4 |
| 6 | 4 | 85.9 |
| 4 | 6 | 33.3 |
| 2 | 8 | 36.2 |
| 0 | 10 | 1.8 |

EXAMPLE 11

The polyester fibers as in Example 1 were immersed in carbon tetrachloride for 3 hours at room temperature, withdrawn, wiped lightly with filter paper, and allowed to stand for 5 minutes in open air. The fibers contained 8.9 percent of carbon tetrachloride. The fibers were then heated for 3 hours to 60° C. in a nitrogen atmosphere together with a liquid (pH 6.8) having a composition of 9 parts of 4-vinylpyridine, 1 part of methacrylic acid, 0.5 part of a surface active agent, and 89.5 parts of water, in an amount of about 30 times the weight of the fibers. The heating was carried out in a sealed tube and after removing non-graft polymers from the fibers by washing with ethanol, the grafting percentage of the grafted fibers was measured. The ascertained value was 42.4 percent.

In addition, for comparison, the same procedure was conducted without the treatment with carbon tetrachloride. The grafting percentage was then less than 1 percent.

EXAMPLE 12

The same procedure as in Example 11 was carried out while omitting the pretreatment with carbon tetrachloride as in the aforesaid comparative experiment, but adding instead 5 parts of carbon tetrachloride to the reaction mixture of the graft polymerization. The grafting percentage of the fibers was 28.2 percent.

EXAMPLE 13

By conducting the treatment with carbon tetrachloride at room temperature as in Example 11, polyester fibers containing 3 percent of carbon tetrachloride were prepared. The fibers were heated at 60° C. for 6 hours in the presence of air together with a liquid (pH 7.0) having the same composition as in Example 11, except that acrylic acid was used instead of methacrylic acid. The grafting percentage of the grafted fibers was 7.6 percent.

EXAMPLE 14

Commercially available polyester fibers were treated for 1 hour at the temperature shown in Table 5 with a binary liquid system mixture consisting of 50 parts of carbon tetrachloride and 50 parts of a swelling agent for polyester, such as, chloroform, ethylene dichloride or dimethyl formamide. The fibers were withdrawn, wiped with filter paper, and immediately weighed. The amount of the liquid incorporated in the fibers is shown in Table 5.

The fibers were then heated in a select tube for 6 hours at 60° C. in a nitrogen atmosphere together with a liquid (pH 7.0) consisting of 9 parts of 4-vinylpyridine, 1 part of acrylic acid, 0.5 part of surface active agent and 89.5 parts of water in an amount of about 30 times the weight of the fibers. After removing non-graft polymers by washing the fibers with ethanol, the grafting percentage was measured. The value was above 18.2 percent in each case as shown in the same table.

In addition, for comparison, the same procedure as above was conducted using chloroform, ethylene dichloride or dimethyl formamide alone without adding carbon tetrachloride. The grafting percentage was then less than 3.3 percent.

TABLE 5

| Pre-treatment condition Composition (weight ratio) | A(°C.) | B(%) | Grafting percentage |
|---|---|---|---|
| $CCl_4$ 5: $CHCl_3$ 5 | 61 | 25.8 | 32.5 |
| $CCl_4$ 5: $CH_2Cl_2$ 5 | 76 | 31.4 | 19.1 |
| $CCl_4$ 5: dimethylformamide 5 | 76 | 22.1 | 18.2 |
| $CHCl_3$ (control) | 61 | 28.4 | 3.3 |
| $CH_2Cl_2$ (control) | 83 | 27.0 | −1.5 |
| dimethylformamide (control) | 100 | 29.5 | −1.0 |

A: heating temperature;

B: incorporated amount of liquid.

EXAMPLE 15

A piece of polyethylene terephthalate film having a thickness of 0.1 mm. was washed with water, dried, and then immersed in a mixture of 50 parts of carbon tetrachloride and 50 parts of chloroform to incorporate 18.2 percent of the liquid in the film by the procedure described in Example 14. The graft polymerization was thereafter carried out under the same conditions as in Example 14. The grafting percentage of the grafted film was 6.4 percent.

EXAMPLE 16

The polyethylene terephthalate fibers as in Example 1 were washed with cold water for 24 hours and dried at room temperature under reduced pressure. About 100 mg. of the fibers were then immersed in a mixture of 10 parts of carbon tetrabromide and 90 parts of benzene for 16 hours at 50° C. When the fibers were air-dried for 5.5 hours at room temperature and then weighed it was confirmed that the weight of the fibers had increased by 12.0 percent due to incorporation of the mixture of carbon tetrabromide and benzene.

The fibers were then placed in a test tube having an outer diameter of 1 cm. A mixture of 9 parts of 4-vinylpyridine, 1 part of acrylic acid, 0.5 part of the emulsifier and 90 parts of water was added to the tube, as in Example 1. After purging the air in the test tube with nitrogen gas for 2 minutes and sealing the same, the system was heated at 50° C. for 2 hours and non-graft polymers were removed from the grafted fibers by the same manner as in Example 1. Polyethylene terephthalate fibers to which 26.5 percent of the mixture of 4-vinylpyridine and acrylic acid had been grafted were thus obtained.

EXAMPLE 17

Polyethylene terephthalate fibers containing a mixture of carbon tetrabromide and benzene were prepared by the same procedure as in Example 16. The fibers were placed in a test tube having an outer diameter of 1 cm. A mixture of 9 parts of 4-vinylpyridine, 1 part of acrylic acid, 0.5 part of the emulsifier and 90 parts of water was added to the test tube as in Example 1. The tube was sealed after passing nitrogen gas through the test tube for 2 minutes to purge the air. The system was then irradiated by gamma rays of $1.1 \times 10^4$ roentgens/hr under heating at 50° C. The fibers were then withdrawn, non-graft polymers were removed therefrom in the same manner as in Example 1 and the grafting percentage of the fibers was measured. The value was 45.2 percent.

In addition, for comparison, polyethylene terephthalate fibers were pretreated with benzene only to incorporate 4.5 percent of benzene in the fibers in a manner similar as above. The system was irradiated by gamma rays for 6 hours under heating at 50° C. The grafting percentage was only 20.6 percent.

EXAMPLE 18

The polyethylene terephthalate as in Example 1 was washed with cold water for 24 hours and dried at room temperature under reduced pressure. About 100 mg. of the fibers were immersed in silicon tetrachloride for 16 hours at 50° C., withdrawn, air-dried for 30 minutes at room temperature, and weighed. It was ascertained that the fibers contained silicon tetrachloride in an amount of 3.1 percent of the weight of the fibers. The fibers were then placed in a test tube of 1 cm diameter and an aqueous emulsion of 4-vinylpyridine and acrylic acid having the same composition as in Example 4 was added to the tube. After purging the air in the tube with nitrogen and sealing the tube, the system was heated at 50° C. for 2 hours. After removing non-graft polymers in the same manner as in Example 1, the grafting percentage of the fibers thus grafted was measured. The grafting percentage was 7.0 percent.

EXAMPLE 19

The polyethylene terephthalate as in Example 1 was washed with cold water for 24 hours, and dried at room temperature under reduced pressure. About 100 mg. of the fibers were then immersed in a mixture of 10 parts of hexachloroethane and 90 parts of benzene for 18 hours at 50° C. The fibers were then withdrawn and weighed, to show a weight increase of 9.2 percent through impregnation or incorporation of the mixture. The fibers were placed in a test tube of 1 cm diameter in an aqueous emulsion of 4-vinylpyridine and acrylic acid having the same composition as in Example 4. After purging the air in the test tube with nitrogen gas and sealing it, the system was heated for 6 hours at 50° C. After removing non-graft polymers in the same manner as in Example 1, the grafting percentage of the fibers was measured. The value was 50.3 percent.

EXAMPLE 20

The same procedure as in Example 19 was carried out, except that the fibers were irradiated for 2 hours by gamma rays of $1.1 \times 10^4$ roentgens/hr. from $Co^{60}$ under heating at 50° C. instead of heating them at 50° C. for 2 hours. The grafting percentage of the fibers was then 79.2 percent.

EXAMPLE 21

The polyester fibers as in Example 1 were washed with cold water for 20 hours and dried at room temperature under reduced pressure. About 100 mg. of the fibers were then immersed in carbon tetrachloride for 1 hour at 50° C. After the fibers were air-dried for 1 hour at room temperature, it was confirmed that the fibers contained 17.3 percent of carbon tetrachloride. The fibers were then stretched to 5 times their initial length in water at 80° C. The content of carbon tetrachloride was then 5.45 percent.

The fibers were then placed in a test tube having an outer diameter of 1 cm. and 10 ml. of a mixture of 10 parts of 4-vinylpyridine, 1 part of acrylic acid, 90 parts of water and 0.5 part of the emulsifier as in Example 1 was added to the test tube. After purging the air in the test tube with nitrogen for 2 minutes and sealing it, the system was heated for 2 hours at 50° C. After withdrawing the fibers, non-graft polymers were removed therefrom by the same manner as in Example 1. After drying the fibers in a vacuum oven at 50° C., the fibers were weighed. The grafting percentage was 40.7 percent.

EXAMPLE 22

The polyester fibers as in Example 1 were washed with cold water for 20 hours, dried at room temperature under reduced pressure and about 100 mg. of the fibers were immersed in carbon tetrachloride for 15 minutes at 35° C. The fibers were withdrawn and air-dried for 1 hour at normal room temperature, whereby fibers containing 4.3 percent of carbon tetrachloride were obtained.

The fibers were then placed in a test tube having an outer diameter of 1 cm. and 5 ml. of a mixture of 10 parts of 2-methyl-5-vinylpyridine, 1 part of acrylic acid, 90 parts of water and 0.5 part of the emulsifier of Example 1 was added to the tube. The tube was sufficiently evacuated by a vacuum line and sealed under vacuum. The system was then heated at 50° C. for 2 hours and the fibers were withdrawn therefrom. The fibers thus obtained had a very good opening property and the grafted product contained almost no non-graft polymers. The grafted fibers were washed with methanol and the grafting percentage of the fibers was measured, which showed a value of 12.5 percent.

EXAMPLE 23

The polyester fibers as in Example 22 were impregnated with 4.3 percent of carbon tetrachloride in the same manner as in said example. The fibers were then placed in a test tube having an outer diameter of 1 cm. and a mixture of 10 parts of 4-vinylpyridine, 1 part of maleic anhydride, 90 parts of water and 0.5 part of the emulsifier of Example 1 was added to the test tube. After evacuating sufficiently the test tube by means of a vacuum pump and sealing the test tube under vacuum, the system was heated for 30 minutes at 50° C. and the fibers were withdrawn therefrom. The grafted fibers thus obtained showed a very excellent opening property and contained almost no non-graft polymers. After washing the fibers first with warm water at 50° C. and then ethanol, the grafting percentage of the fibers was measured, the value of which was 45.8 percent.

EXAMPLE 24

When the same procedure as in Example 23 was carried out using itaconic acid instead of maleic anhydride, the grafting percentage of the fibers obtained was 26.4 percent.

EXAMPLE 25

The polyester fibers as in Example 1 were impregnated with 5.1 percent of carbon tetrachloride in the same manner as in Example 22. The fibers were placed in a test tube having an outer diameter of 1 cm. and 5 ml. of a mixture of 10 parts of 4-vinylpyridine, 1 part of allylsulfonate, 90 parts of water and 0.5 part of the emulsifier of Example 1 was added to the test tube. After purging the air in the test tube for 2 minutes with nitrogen and sealing the tube, the system was irradiated by gamma rays of $1.1 \times 10^4$ roentgens/hr. for 1 hour under heating at 50° C. to provide grafted fibers exhibiting a very good opening property. In addition, although the grafted fibers contained almost no non-graft polymers, they were washed with water of 50° C., and with ethanol at room temperature and the grafting percentage of the fibers was measured, the value of which was 60.4 percent.

EXAMPLE 26

The same procedure as in Example 25 was carried out using sodium acrylate instead of allylsulfonate. The grafting percentage of the grafted fibers was 39.5 percent.

EXAMPLE 27

The same procedure as in Example 25 was carried out using potassium acrylate instead of allylsulfonate. The grafting percentage of the fibers thus grafted was 36.6 percent.

EXAMPLE 28

The polyester fibers as in Example 1 were washed with cold water for 20 hours, dried at room temperature under reduced pressure, and about 100 mg. of the fibers was immersed in carbon tetrachloride for 30 minutes at 40° C. The fibers were withdrawn, and air-dried for 1 hour at room temperature whereby fibers containing 18 percent of carbon tetrachloride were obtained.

The fibers were placed in a test tube having an outer diameter of 1 cm and after adding 5 parts of a 4-vinylpyridine-styrene mixture, 0.5 part of emulsifier and 94.5 parts of water, the system was heated at 60° C. for 3 hours to conduct the graft polymerization. By removing non-graft polymers by washing the fibers with benzene and ethanol, a graft polymer having a high grafting percentage as shown in the following Table 6 was obtained. For comparison, the same procedure as above was conducted without employing 4-vinylpyridine. The grafting percentage of the fibers thus obtained was then very low.

TABLE 6

| Mixing ratio in weight | | Grafting |
| 4-Vinylpyridine | Styrene | percentage |
| --- | --- | --- |
| 10 | 0 | 88.0 |
| 8 | 2 | 89.8 |
| 6 | 4 | 77.7 |
| 4 | 6 | 45.4 |
| 2 | 8 | 23.7 |
| 0 | 10 | 3.8 |

EXAMPLE 29

The same grafting reaction as in Example 28 was conducted using a mixture of 4-vinylpyridine and methyl methacrylate instead of a mixture of 4-vinylpyridine and styrene and non-graft polymers were removed by acetone and ethanol to obtain grafted fibers having a high grafting percentage as shown in the following Table 7. On the other hand, when the same procedure was repeated while using only methyl methacrylate, the grafting percentage of the fibers thus grafted was very low.

TABLE 7

| Mixing ratio in weight | | Grafting percentage |
|---|---|---|
| 4-Vinylpyridine | Methyl methacrylate | |
| 10 | 0 | 77.4 |
| 8 | 2 | 50.4 |
| 6 | 4 | 33.5 |
| 4 | 6 | 25.1 |
| 2 | 8 | 15.2 |
| 0 | 10 | 1.1 |

What is claimed is:

1. In a process of graft polymerizing a polymerizable monomer to polyethylene terephthalate, the improvement which comprises that the polymerizable monomer is of hydrophilic nature and comprises 4-vinyl pyridine, 2-vinyl pyridine or 2methyl-5vinyl pyridine and the graft polymerization is carried out in the presence of at least 3 percent by weight, calculated on the amount of polyethylene terephthalate of a halide of the formula $M_nX_{2n+2}$, wherein M is carbon or silicon, X is Cl or Br and $n$ is 1 or 2.

2. The improvement as claimed in claim 1, wherein said polymerizable monomer also comprises a polymerizable unsaturated organic acid or its sodium salt.

3. The improvement as claimed in claim 1, wherein the process is carried out by first immersing the polyethylene terephthalate in said halide or a solution thereof to incorporate between about 0.3–25 percent of said halide within the polyethylene terephthalate structure, whereafter the grafting reaction in the presence of said monomer is performed.

4. The improvement as claimed in claim 1, wherein said polymerizable monomer, in addition to said 4-vinyl pyridine, 2-vinyl pyridine or 2-methyl-5-vinyl pyridine, contains a member selected from the group consisting of acrylic acid, methacrylic acid, maleic anhydride, itaconic acid, vinyl-sulfonic acid, allylsulfonic acid, styrene sulfonic acid and the sodium salts of these organic acids.

5. The improvement as claimed in claim 1, wherein said halide is selected from the group consisting of carbon tetrachloride, carbon tetrabromide, hexachloroethane and silicon tetrachloride.

6. A process for the graft polymerization of polyethylene terephthalate, which comprises immersing the polyethylene terephthalate in a solution of a halide represented by the general formula $M_nX_{2n+2}$, wherein M is carbon or silicon, X is Cl or Br and $n$ is 1 or 2, to incorporate between about 0.3–25 percent by weight of said halide into the polyethylene terephthalate structure and then reacting the halide enriched polyethylene terephthalate with at least one hydrophilic polymerizable monomer selected from the group consisting of 4-vinyl pyridine, 2-vinyl pyridine and 2-methyl-5-vinyl pyridine.

7. A process as claimed in claim 6, wherein said reaction between said monomer and said halide enriched polyethylene terephthalate is carried out in a temperature range of from room temperature to 100° C.

8. A process as claimed in claim 6, wherein said 2 vinyl pyridine, 4-vinyl pyridine or 2-methyl-5-vinyl pyridine monomer also contains a member of the group consisting of acrylic acid, methacrylic acid, maleic anhydride, itaconic acid, vinylsulfonic acid, allylsulfonic acid, styrene sulfonic acid and the sodium salt of these organic acids.

9. A process as claimed in claim 6, wherein said halide is carbon tetrachloride, carbon tetrabromide, hexachloroethane or silicon tetrachloride.

10. A process as claimed in claim 6, wherein the graft polymerization reaction between said monomer and said halide enriched polyethylene terephthalate is carried out under irradiation of high energy ionizing rays.

11. A process as claimed in claim 6, wherein the grafting reaction between said polymerizable monomer and said halide enriched polyethylene terephthalate is carried out in the additional presence of a vinyl monomer selected from the group consisting of acrylonitrile, styrene, methyl methacrylate, ethyl methacrylate, propyl methacrylate, ethyl methacrylate, propyl methacrylate, butyl methacrylate, methyl acrylate, ethyl acrylate, propyl acrylate, butyl acrylate and vinyl acetate.

12. A process as claimed in claim 6, wherein said grafting reaction is carried out in the presence of a non-polymerizable acid selected from the group consisting of oxalic acid, formic acid, acetic acid, propionic acid, benzoic acid, sulfuric acid, hydrochloric acid, nitric acid, phosphoric acid and boric acid.

13. A process as claimed in claim 6, wherein said polyethylene terephthalate is used in the form of yarn, fiber or film.

14. A process as claimed in claim 6, wherein the grafting reaction is carried out in an inert gas atmosphere.

* * * * *